(12) United States Patent
Bijman et al.

(10) Patent No.: US 6,590,973 B1
(45) Date of Patent: Jul. 8, 2003

(54) SYSTEM AND METHOD FOR DETECTING AN OFF-HOOK CONDITION

(75) Inventors: Martin Bijman, Stittsville (CA); Don Marlin, Woodlawn (CA)

(73) Assignee: Catena Networks, Inc., Redwood Shores, CA (US)

( * ) Notice: Subject to any disclaimer, the term of this patent is extended or adjusted under 35 U.S.C. 154(b) by 0 days.

(21) Appl. No.: 09/710,980

(22) Filed: Nov. 9, 2000

(30) Foreign Application Priority Data

Nov. 12, 1999 (CA) .............................................. 2289383

(51) Int. Cl.⁷ .............................. H04N 1/00; H04N 3/00
(52) U.S. Cl. ........................ 379/377; 379/399; 379/382; 379/412; 379/413; 379/418
(58) Field of Search ................................. 379/399, 382, 379/377, 412, 413, 418

(56) References Cited

U.S. PATENT DOCUMENTS

| | | | | |
|---|---|---|---|---|
| 4,132,864 A | * | 1/1979 | Feng | |
| 4,406,004 A | * | 9/1983 | Hall et al. | |
| 4,712,233 A | * | 12/1987 | Kuo | |
| 5,109,409 A | * | 4/1992 | Bomgardner et al. | 379/377 |
| 5,659,608 A | * | 8/1997 | Stiefel | 379/399 |
| 6,026,159 A | * | 2/2000 | Apfel | 379/377 |
| 6,178,241 B1 | * | 1/2001 | Zhou | 379/382 |

* cited by examiner

*Primary Examiner*—Forester W. Isen
*Assistant Examiner*—Ramnandan Singh
(74) *Attorney, Agent, or Firm*—Townsend and Townsend and Crew LLP

(57) ABSTRACT

A line card for coupling to customer premises equipment at a termination for detecting hook condition in a telephone system, the line card comprising an interface for transmitting and receiving an analog signal with the telephone line, an AC ring signal generator for generating a ring signal at the customer equipment, a DC signal generator for generating a DC signal when said customer equipment is off hook, and a circuit for determining the duty cycle of a loop current in the customer equipment (telephone) for determining the hook status of the customer equipmen.

5 Claims, 4 Drawing Sheets

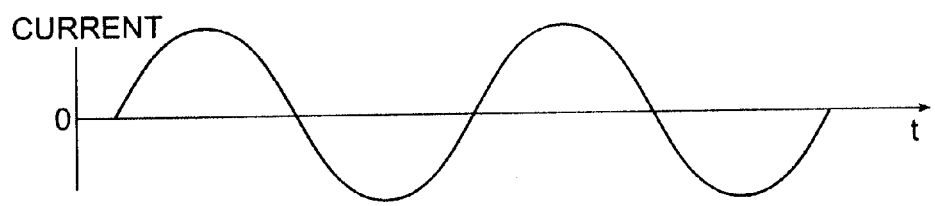
FIG. 4A(i)
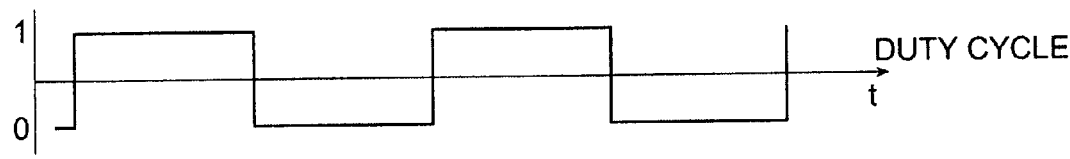
FIG. 4A(ii)
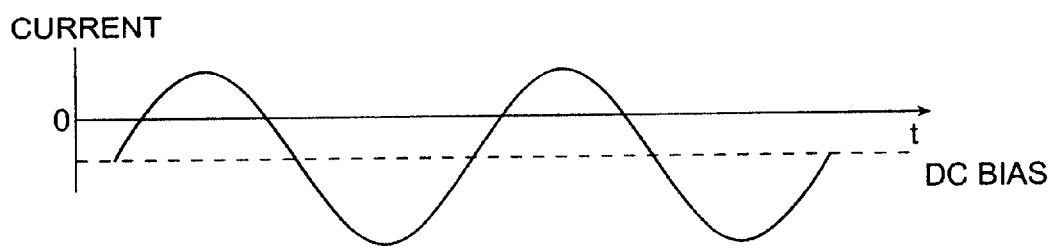
FIG. 4B(i)
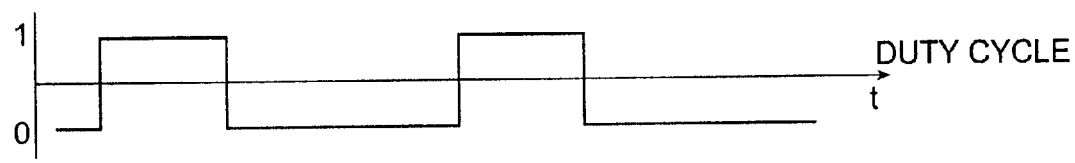
FIG. 4B(ii)

SYSTEM AND METHOD FOR DETECTING AN OFF-HOOK CONDITION

BACKGROUND OF THE INVENTION

The present invention relates generally to the field of telephony, and specifically to the detection of an off-hook condition while a ring signal is present.

In a typical line card for a telephony subscriber loop, the electrical characteristics of the loop are monitored. More specifically, the electrical load current (loop current) must to be monitored to perform supervisory functions and to support transmission of voice signals.

FIG. 1 illustrates a typical circuit 10 that is used for monitoring the loop current. During ringing, it is necessary that telephone systems be capable of detecting when the ringing telephone is taken off-hook, i.e., when the line is answered, and this detection must take place as rapidly and as reliably as possible.

It is desirable to detect the status of a looped subscriber line regardless of whether the subscriber is making a call or receiving a call. When the subscriber is initiating a call, loop detection is not difficult. However the same is not true for a subscriber receiving a call, i.e., when a subscriber unhooks a ringing telephone. In current telephone systems, a direct voltage is superimposed on the ringing waveform, and the loop is detected by virtue of a direct current (DC) component which flows when the telephone is taken off-hook. Such detection becomes very difficult when the alternating current (AC) in the line due to the AC component of the ringing current is considerably greater than the DC component to be detected. Further, the wide variety of line impedances and ringing impedances makes it necessary to design for worst case telephone systems which are generally not optimum in performance for the majority of telephone installations.

As illustrated, a subscriber is connected to a telephone exchange by the tip and ring lines each having a value of line resistance RLoop/2, and a ringer is connected to the terminals of the line. The ringer can be approximated by a resistance Zset connected in series with a capacitance Cs. Likewise across the terminals of the line, and thus in parallel with the ringer, there is the remainder of the subscriber station which is equivalent to a resistance Rt connected in series with a switch S1, where the switch represents the hook-switch of the telephone set. The line is supplied with power by a DC source which delivers a direct voltage of typically 48 volts in most cases. A ringing source formed by an AC ring generator supplies the line with an r.m.s. voltage of 80 VAC.

In the on-hook mode, i.e., for a called subscriber, only the AC generator causes a current to flow, and the value of the current is determined by the line resistance and by the ringer impedance, i.e., the resistance Zset and the capacitance Cs in series. In an offhook hook mode, i.e., once the subscriber has taken the local telephone off hook, the DC generator delivers direct current at a value which is determined by the line resistances and Rt, and the AC generator delivers a current which is determined by the resistance of the line in series with an impedance defined by the resistance Rt in parallel with the impedance of the ringer, and thus in parallel on the series connection of the resistance Zset and the capacitance Cs. The line current in off-hook mode thus comprises a DC component and an AC component.

Known techniques use the loop current for determining an off-hook condition. In a Plain Old Telephone System (POTS), the determination that the subscriber has gone off hook while the ring signal is still present on the loop requires a combination of discrete components and integrated operational amplifiers (op amps), or complex analog integrated filters to replace the discrete components.

FIG. 2 illustrates several known circuits that are used for determining the off-hook condition. When a ringing signal is applied and the subscriber is on hook, a switch S1 is open. Therefore, AC ringing loop current flows through the circuit, but DC loop current does not. When the subscriber goes off hook, the switch S1 is closed, and the loop current is the sum of the AC ringing loop current and the DC loop current. In order to determine if sufficient DC loop current on average is flowing for indicating that the subscriber is off-hook, the AC loop current present in the sensed loop current is filtered. The remaining current is then compared to a threshold value.

The AC ringing loop current is filtered from the sensed loop current with either external discrete components, usually single-pole 12 or double-pole 14 passive circuits, or integrated amplifiers 16 with on-chip or off-chip filter components, or a more complex integrated ring trip filter 18. The filtered current is then passed through a comparator 20 for comparing it to a threshold value 22.

These solutions, however, are costly in terms of required components, area, and power. Component selection is a trade-off between the speed of detection and debouncing of detection, for achieving a minimal delay period for threshold detection.

What is needed is a mechanism to obviate or mitigate at least some of the above disadvantages.

SUMMARY OF THE INVENTION

In accordance with the present invention, a line card is provided for terminating a telephone line and for coupling to customer premises equipment (a telephone) wherein the line card has an interface for transmitting and receiving an analog signal along the telephone line, an AC ring signal generator for generating a ring signal, a DC signal generator for generating a DC signal when said customer equipment is off-hook, and a circuit for determining the duty cycle of a loop current in the telephone for determining the hook status of the customer equipment.

In accordance with an embodiment of the invention, a method is provided for determining a hook status of a customer's telephone equipment comprising the steps of detecting a loop current having a duty cycle dependant on customer equipment hook status, determining the duty cycle of the loop current, and comparing the duty cycle to a threshold, the comparison being used for determining the customer hook status.

BRIEF DESCRIPTION OF THE DRAWINGS

An embodiment of the invention will now be described by way of example only, with reference to the accompanying drawings in which:

FIGS. 4(A)(i) and 4(A) (ii) and 4(B)(i) and 4(B) (ii) are graphs illustrating the loop current while ringing for the on-hook and off-hook conditions, respectively.

DESCRIPTION OF THE SPECIFIC EMBODIMENTS

Figure 1:
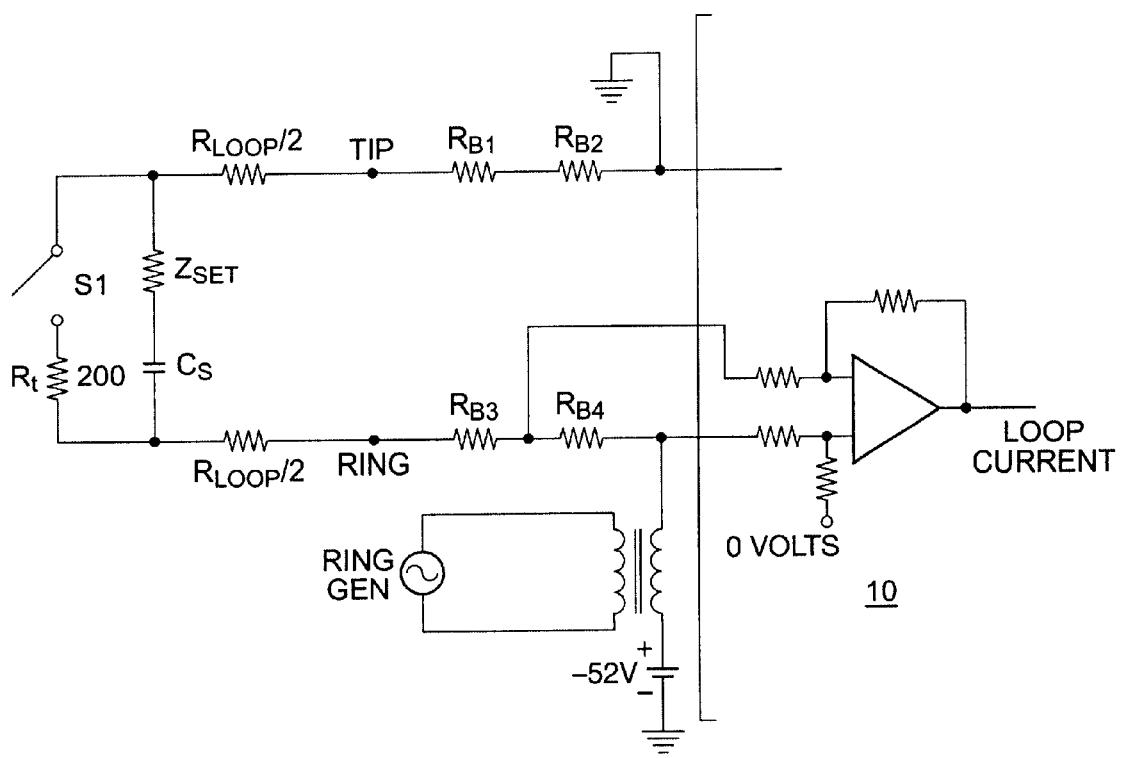
FIG. 1 is a schematic diagram of a typical current sense circuit according to the prior art.
Figure 2:
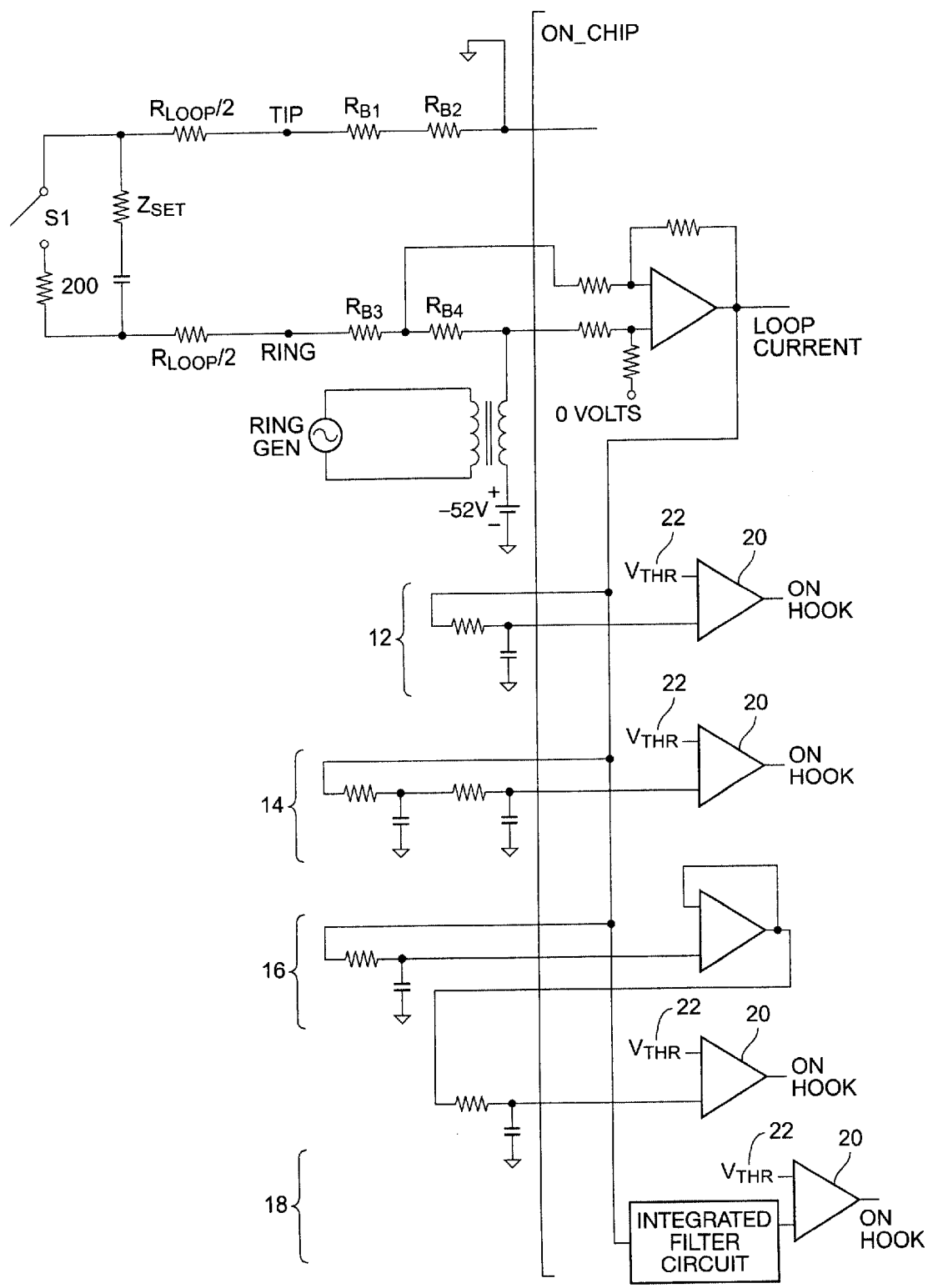
FIG. 2 is a schematic diagram illustrating several circuits for detecting a hook status according to the prior art.

For convenience, in the following description, like numerals refer to like structures in the drawings.

Figure 3:
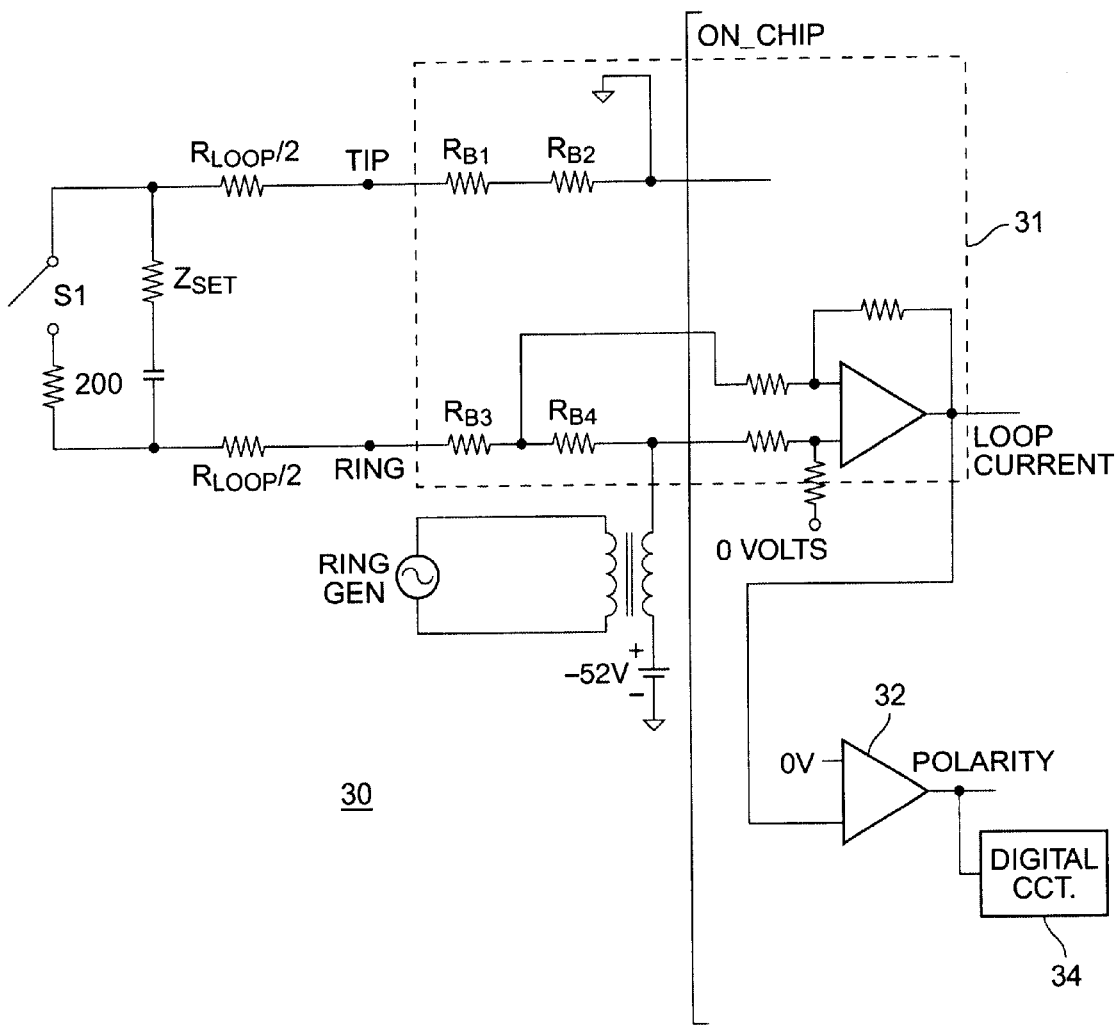
FIG. 3 is a schematic diagram of a circuit used for detecting a hook status according to an embodiment of the invention.

Referring to FIG. 3, there is shown a hook status detector circuit 30 according to an embodiment of the invention. The hook status detector circuit 30 includes a loop current monitor circuit 31 coupled to an analog interface circuit 32 and a digital circuit 34 for processing the output of the of the analog circuit to determine a hook status. The analog interface 32 is operative to detect the polarity of the loop current while ring voltages are being applied, and it outputs a signal indicative of the polarity reversals of the loop current. The digital circuit 34 monitors the duty cycle of the polarity changes from the analog interface, as it will alter significantly when the subscriber goes off-hook.

Referring to FIG. 4(A)(i), there is shown a graph of the loop current when a ring signal is applied to the loop and the subscriber is on hook. When the subscriber is on-hook, there is little or no DC loop current flowing in the loop since the switch S1 is open. The direction of the loop current alternates at a duty cycle of approximately 50%, due to the symmetric nature of the AC ring signal, (i.e., little or no DC offset), as shown in FIG. 4(A)(ii). (For clarity, the term "duty cycle" is used in the present context to mean the ratios of the length of time that an AC signal of interest occurs above or below a predetermined reference level in a given cycle.)

Referring to FIG. 4(B)(i), there is shown a graph of the loop current when the subscriber is off hook. When the subscriber is off hook, the switch S1 is closed and a DC current is introduced in the loop. The total loop current is, therefore, the sum of the DC current plus the ringing AC current. As illustrated in FIG. 4(B)(ii), the direction of the loop current still alternates because the magnitude of the DC loop voltage, typically −52V, is less than the ringing AC voltage, typically 85Vrms. However, the duty cycle (determined with respect to the zero crossing) for the loop current is clearly less than 50% (due to the DC offset).

The analog interface 32 is used for detecting when the loop current is positive or negative. The interface 32 may be implemented with a comparator. However, other implementations will be apparent to persons skilled in the art. The interface 32 can be integrated into an ASIC (Application Specific Integrated Circuit) device with a small chip area and power requirement. The comparator is operative to compare a voltage corresponding to the loop current with a value of zero (0) volts. If the loop current is above zero (flowing in the positive direction), the compartor outputs a value of one. If the loop current is below zero (flowing in a negative direction), the comparator outputs a value of zero. The output of the interface 32 is, therefore, a digital representation of the polarity of the loop current and is provided as an input to the digital circuit 34.

The digital circuit 34 is of the type that can detect when the subscriber goes off hook by determining the duty cycle of the loop current, such as by timing the lengths of portions of the duty cycle and determining a difference greater than a threshold. If the duty cycle falls in a first range of values, the subscriber is determined to be on hook. If, however, the duty cycle falls in a second range of values, then the subscriber is determined to be off hook. In a preferred embodiment, the range chosen depends on the ratio of DC loop voltage VDC to rms AC ringing voltage $V_{ACrms}$. The off-hook duty cycle $TO_{OH}$ is approximately equal to:

$$T_{OH}=(0.5-\mathrm{asin}(V_{DC}/V_{ACrms})/\mathrm{pi}).$$

In one portion of the duty cycle, the time comparator outputs a one to be divided by the time, and in another portion of the duty cycle the comparator outputs a zero to be divided by time. If the time of a one divided by the time of a zero is equal to or greater than a threshold ratio defining the off hook duty cycle, then an off-hook condition is indicated as detected.

Furthermore, when the subscriber goes off hook there may be some transient behavior of the telephone set or line card. The loop current phase may also change due to the difference in telephone set impedance on-hook compared to off-hook. Therefore, some debouncing of the overall period of the loop current is needed. Finally, noise present on the ring signal may require some additional filtering of the zero-crossing output. (The zero-crossing output refers to the condition each time the current creates a condition in which the measured voltage crosses the value of zero volts. Typically this condition signals that the alternating current has switched direction.) However, if there is noise on the ring signal, and if the current is close to zero, the noise may make it appear that the current is changing directions quickly back and forth.

In a preferred embodiment, the digital circuit 34 includes a circuit that alternately measures the length of time the loop current is flowing in one direction (positive or negative), and the length of time the loop current flows in the opposite direction, on a continual basis. Furthermore, with each measurement, the time measured for the loop current flowing in one direction is added to the previous measurement of the loop current flowing in the opposite direction. This sum of the times for the current in each direction provides a measured period.

Therefore, in order to facilitate debouncing, the previous condition is true only when the measured period is equal to the period of the ring signal (within an acceptable tolerance). The embodiment described above is only one way of implementing the digital component 34 of the circuit and performing debouncing. Other methods will be apparent to a person skilled in the art.

The line card described in the above description is not restricted to a voiceband only line card. The invention may be used with other line cards, including Digital Subscriber Line (DSL) line cards. DSL line cards may communicate using a number of different methods that impress a signal representing a digital bit stream onto twisted pair loops conventionally used to carry POTS signals. These methods include ADSL (Asymmetric DSL), SDSL (Symmetric DSL), HDSL (High-rate DSL), VDSL (Very high-rate DSL), ISDN (Integrated Services Digital Network), MVL (Multiple Virtual Lines), and CAP (Carrierless Amplitude/Phase).

Although the invention has been described with reference to certain specific embodiments, various modifications thereof will be apparent to those skilled in the art without departing from the spirit and scope of the invention as outlined in the claims appended hereto.

What is claimed is:

1. In a telephone system, a method for determining a hook status of a customer premises equipment comprising the steps of:
   (a) detecting a loop current;
   (b) determining a duty cycle of the loop current; and
   (c) comparing the duty cycle to a ratio threshold, to determine the hook status of the customer premises equipment.

2. In a telephone system, a line card for coupling to a customer premises equipment at a termination for detecting a hook condition, the line card comprising:
   an interface that transmits and receives an analog signal along a telephone line;
   an AC ring signal generator that generates a ring signal at the customer premises equipment;

a first circuit that determines a duty cycle of a loop current in the telephone line, and that determines a hook status of the customer premises equipment based on the duty cycle, wherein the first circuit determines the duty cycle based on a ratio of a DC loop voltage to a root-mean-squared AC ringing voltage; and a DC signal generator, coupled to the first circuit, that generates a DC signal based on the hook status of the customer premises equipment.

3. The line card of claim 2, wherein the first circuit is a digital circuit.

4. The line card of claim 2, wherein the first circuit determines the duty cycle by timing lengths of portions of the duty cycle and determining a difference greater than a threshold.

5. The line card of claim 2, wherein the first circuit comprises:

a measuring circuit that measures a first length of time the loop current is flowing in a first direction and a second length of time the loop current is flowing in a second direction, and that calculates a measured period therefrom to facilitate debouncing.

* * * * *